US009944158B2

(12) United States Patent
Beach (10) Patent No.: US 9,944,158 B2
(45) Date of Patent: *Apr. 17, 2018

(54) PLASTIC CHANNEL ASSEMBLY-BELOW BELT BRACKET FOR GLASSRUN SYSTEM

(71) Applicant: COOPER-STANDARD AUTOMOTIVE INC., Novi, MI (US)

(72) Inventor: Daniel S. Beach, Clarkston, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,290

(22) Filed: Feb. 1, 2016

(65) Prior Publication Data

US 2016/0144700 A1 May 26, 2016

Related U.S. Application Data

(63) Continuation of application No. 14/421,313, filed as application No. PCT/US2013/054884 on Aug. 14, 2013, now Pat. No. 9,272,612.

(60) Provisional application No. 61/682,967, filed on Aug. 14, 2012.

(51) Int. Cl.
| | |
|---|---|
| *E05F 11/38* | (2006.01) |
| *B60J 10/76* | (2016.01) |
| *B60J 10/30* | (2016.01) |
| *B60J 5/04* | (2006.01) |
| *B60J 10/32* | (2016.01) |

(52) U.S. Cl.
CPC ............ *B60J 10/76* (2016.02); *B60J 5/0412* (2013.01); *B60J 5/0413* (2013.01); *B60J 10/30* (2016.02); *B60J 10/32* (2016.02); *Y10T 29/49622* (2015.01)

(58) Field of Classification Search
CPC ................................. B60J 10/042; B60J 10/08
USPC .................. 49/440, 441, 348, 350, 351, 352
See application file for complete search history.

(56) References Cited

U.S. PATENT DOCUMENTS

| | | |
|---|---|---|
| 5,524,388 A | 6/1996 | Chowdhury et al. |
| 5,548,929 A | 8/1996 | Larsen et al. |
| 5,651,217 A | 7/1997 | Mesnel |
| (Continued) | | |

FOREIGN PATENT DOCUMENTS

FR    2 990 160    11/2013

OTHER PUBLICATIONS

PCT/US2013/054884 International Search Report and Written Opinion.

(Continued)

*Primary Examiner* — Jerry E Redman
(74) *Attorney, Agent, or Firm* — Fay Sharpe LLP (57) ABSTRACT

A below belt bracket assembly includes a weatherstrip or glassrun having first and second sidewalls interconnected along a base member that form a cavity configured to receive an associated window edge. A support member has a cavity configured to at least partially receive the weatherstrip. A first end of the support member includes first and second retention members that each operatively engage an end region of the weatherstrip. A recess/opening formed between the first and second retention members is dimensioned to receive the end region of the base member such that the end region of the weatherstrip base member ramps downwardly from the support member base wall through the recess/opening.

17 Claims, 12 Drawing Sheets

(56) References Cited

U.S. PATENT DOCUMENTS

| | | |
|---|---|---|
| 6,811,194 B1 | 11/2004 | Gaertner et al. |
| 6,962,350 B2 | 11/2005 | Berry et al. |
| 8,561,353 B2 | 10/2013 | Terai et al. |
| 9,272,612 B2 * | 3/2016 | Beach .................... B60J 5/0412 |
| 2005/0188622 A1 | 9/2005 | Nestell |
| 2006/0005469 A1 | 1/2006 | Bara et al. |
| 2006/0064936 A1 | 3/2006 | Shiraiwa et al. |
| 2007/0262607 A1 | 11/2007 | Saito |
| 2011/0204671 A1 | 8/2011 | Baratin |
| 2012/0174491 A1 | 7/2012 | Clark et al. |

OTHER PUBLICATIONS

EP 13 82 9247 Supplementary European Search Report, dated Jun. 30, 2016.

* cited by examiner

PLASTIC CHANNEL ASSEMBLY-BELOW BELT BRACKET FOR GLASSRUN SYSTEM

This application is a continuation application of U.S. application Ser. No. 14/421,313, filed on Feb. 12, 2015, now U.S. Pat. No. 9,272,612, as a national stage application submission under 35 U.S.C. 371 of PCT/US2013/054884, filed on 14 Aug. 2013, and claims the priority benefit of U.S. Provisional Application No. 61/682,967, filed on Aug. 14, 2012, the disclosures of which are incorporated herein by reference.

BACKGROUND

This disclosure generally relates to a below belt channel system that is mounted to the frame of a vehicle door below a belt line of a window opening. More specifically, this disclosure relates to what is generally referred to as a glassrun that receives or guides an edge of a vehicle window that is raised and lowered relative to the window opening.

It is known to provide a generally C-shaped support channel or bracket that receives a similarly contoured C-shaped weatherstrip or weatherseal formed of a plastic or EPDM type material and referred to as an extrusion. An open region of the C-shaped contour receives an edge of the window and guides the window as the window is raised and lowered relative to the vehicle door.

To mechanically join the extrusion to the below built bracket assembly, a terminal end of the extrusion is typically notched, i.e., cut in selected locations to allow first and second sidewalls of the extrusion to flex or move independently of an interconnecting, base member of the extrusion. The notch allows the first and second sidewalls to flare or taper outwardly to a greater degree relative to the base member and thereby enlarge an entrance dimension at a first end of the bracket. The notching operation adds additional cost to the final assembly. For example, machinery must be dedicated to perform the notching. In addition, the notched end must be contoured over a tapered opening in the support bracket.

In an alternative arrangement, the terminal end of the extrusion remains interconnected no notching) and the first and second sidewalls are bent or splayed outwardly relative to the base member. The first and second sidewalls are received in retention members spaced inwardly from a terminal end of the bracket. Unfortunately, there is the potential that the extrusion will become disengaged from the bracket during shipment, assembly, or during use. This structural assembly also encounters potential issues where the there is no smooth transition as the glass advances into the glass run assembly, and the potential for interference between the advancing window and the weatherstrip of the glassrun assembly can arise.

These known arrangements also have the potential for glass slap, a condition where insufficient clearance is provided and the contact between the glass and the bracket emits an audible noise when the door is closed.

Still another problem is associated with distortion or warping of the plastic bracket during manufacture.

Accordingly, a need exists for an improved below belt bracket arrangement that overcomes these noted problems and others in an economical, simple, and effective manner.

SUMMARY

A below belt bracket assembly includes a weatherstrip having first and second sidewalls interconnected to a base member, and forming a cavity configured to receive an associated window edge. The assembly further includes a support member having a cavity configured to at least partially receive the weatherstrip therein, the support member including first and second retention members at a first end that each operatively engage an end region of the weatherstrip, and an opening/recess between the first and second retention members dimensioned to receive the end region of the base member.

The support member includes first and second sidewalls that receive first and second sidewalls, respectively, of the weatherstrip and a base wall that interconnects the first and second sidewalls of the support member.

The support member base wall includes the opening/recess that is dimensioned to receive the end region of the weatherstrip base member.

The end region of the weatherstrip base member ramps downwardly from the base wall of the support member through the opening/recess.

The first and second sidewalls diverge from one another along the end region.

The first and second retention members are configured to apply to an upper surface of the weatherstrip base member and position a terminal end of the weatherstrip base member below the base wall of the support member.

The first and second retention members extend into the support member cavity from respective terminal ends of the support member sidewalls.

Lower edges of the first and second retention members are configured to engage the upper surface of the weatherstrip base member along respective interfaces with the first and second sidewalls of the weatherstrip.

The base wall includes at least one stiffening member extending along at least a portion of the longitudinal length of the support member, and preferably first and second continuous ribs are provided along an outer surface of the support member.

The retention members extend outwardly at the first end of the bracket in a longitudinal direction opposite that of the second end.

Each retention member includes a generally U-shaped hook confirmation in which a first leg of the Hulk extends in a longitudinal direction of the first end of the bracket and a second leg extends in an opposite longitudinal direction toward the second end of the bracket.

The first and second legs of the retention members are spaced apart a first dimension that receives the first and second sidewalls of the glassrun.

A method of making a glassrun assembly for an associated automotive vehicle includes providing a glassrun having first and second ends disposed in spaced relation along an elongated direction, the glassrun including first and second sidewalls joined by a base member. Method further clues providing a rigid bracket having first and second ends disposed in spaced relation along an elongated direction, the bracket including first and second sidewalls disposed in spaced relation and interconnect along one edge by a base wall to define a cavity. The base wall includes a recess at the first end extending inwardly a limited dimension toward the second end of the bracket. The method further includes positioning the glass run in the bracket cavity such that the first end of the glassrun base member is received in the recess at the first end of the bracket.

The bracket providing step includes providing first and second retention members on the first and second sidewalls that receive the terminal first ends of the first and second sidewalls of the glassrun.

Glass run positioning step includes locating the terminal end of the glassrun base member beneath the first and second retention members.

A primary benefit of the below belt bracket assembly is the improved retention of the weatherstrip in the support member/bracket.

Another advantage is an improved entry opening to prevent glass interference.

Still another benefit resides in the positioning the extrusion adjacent the end of the bracket to maximize engagement with the window.

Additional clearance is created by the retention member placement so as to reduce glass slap.

A further advantage is associated with the elimination of the notching step to mount the extrusion onto the bracket.

Yet another benefit resides in the improved control of the shrink rate and the provision of anti-warp features.

Still other benefits and advantages of the present disclosure will become apparent upon reading and understanding the following detailed description.

DETAILED DESCRIPTION

Figure 1:
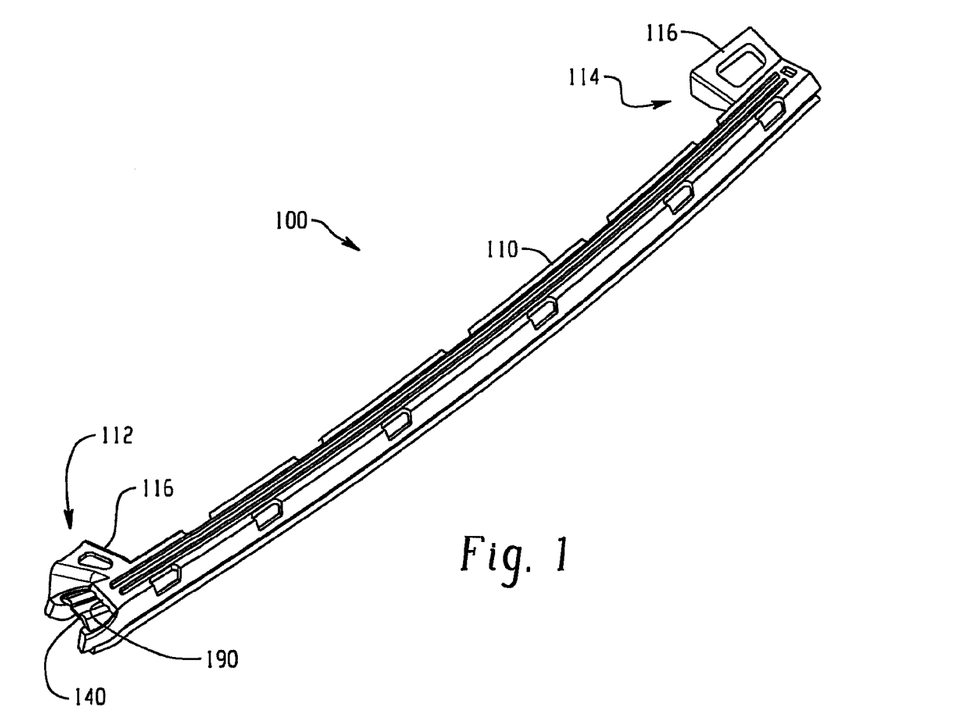
FIG. 1 shows a rear side of a below belt bracket assembly for a glassrun system.

FIG. 1 shows a below belt bracket assembly 100 that includes a support member, channel, or bracket 110 that in the preferred arrangement is formed from a polymer or plastic. The bracket has first and second ends 112, 114 that are spaced in a longitudinal direction. The bracket further includes fastening portions 116 that receive the fasteners (not shown) to secure the bracket 110 at a below belt location in the vehicle door. The bracket 110 includes a first sidewall 120 and a second sidewall 122 that are each interconnected along a first or lower edge to a base wall 124.

A second or upper edge of each sidewall 120, 122 forms a terminal edge. Together, the sidewalls 120, 122 and base wall 124 define a cavity 126 that is dimensioned and configured to receive a weatherstrip or glassrun 140.

Figure 4:
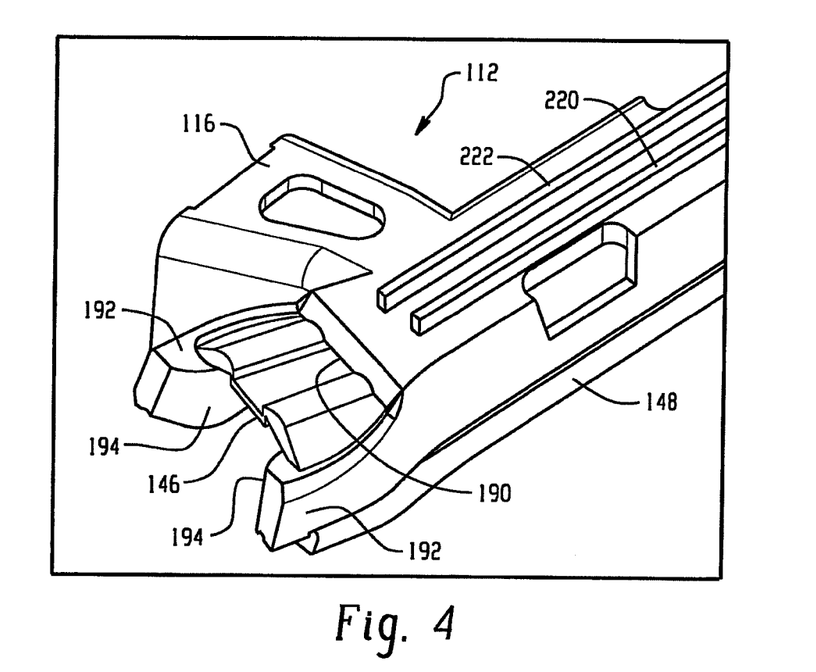
FIG. 4 is an enlarged view of the rear side of the first end of the below belt bracket assembly of FIG. 3.
Figure 5:
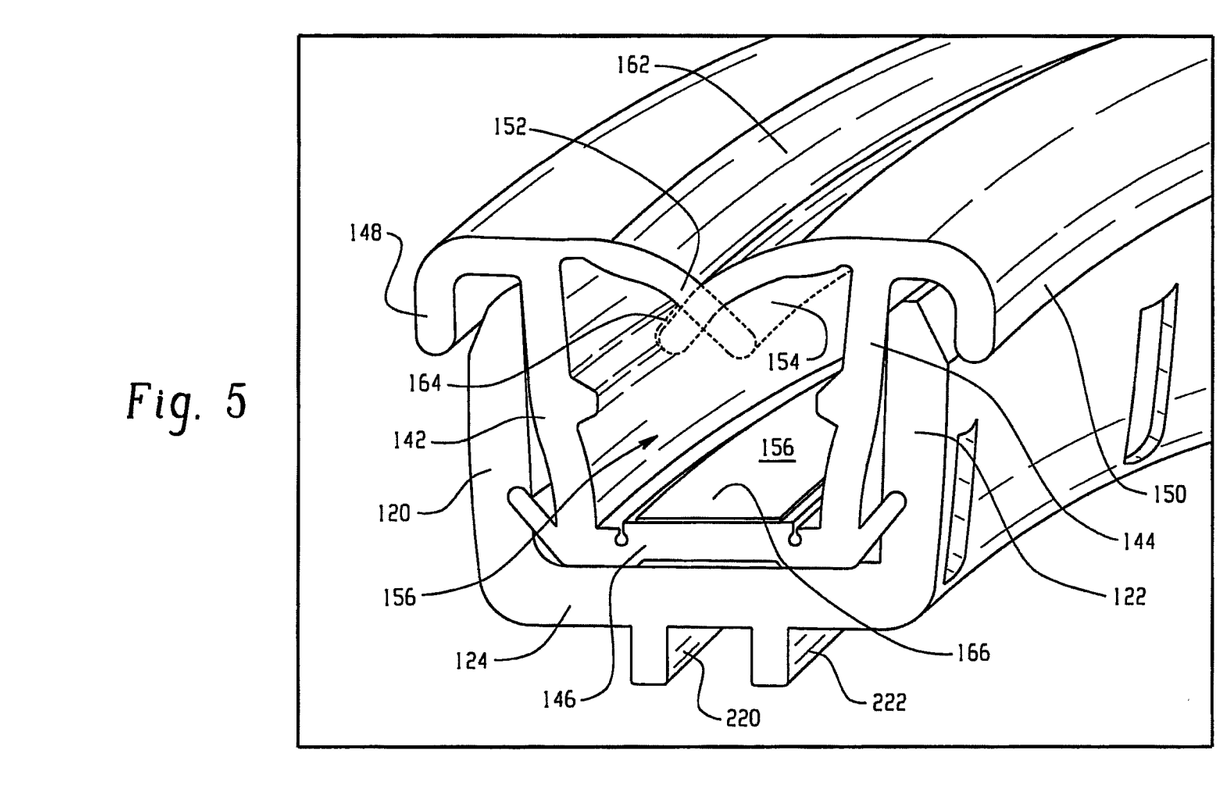
FIG. 5 is a cross-sectional view taken generally along the lines 5-5 of FIG. 3.
Figure 6:
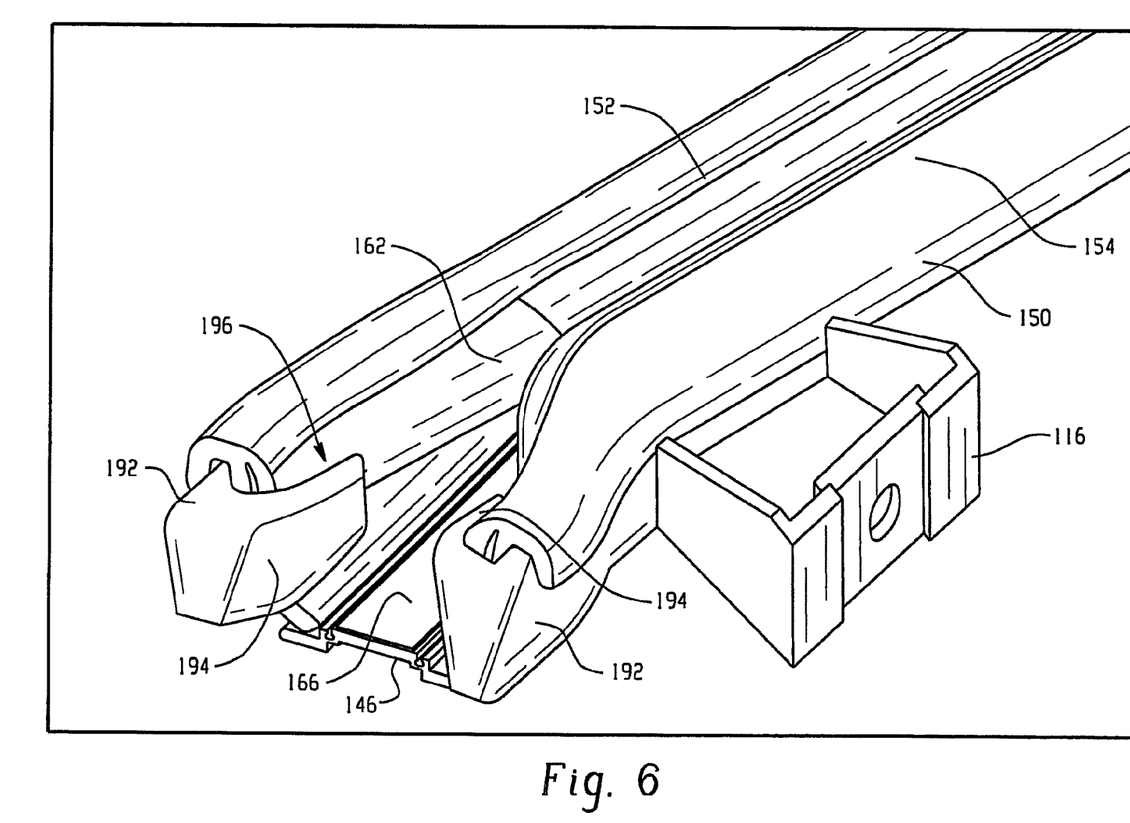
FIG. 6 is a further enlarged view of the first end of the new below belt bracket assembly.
Figure 7:
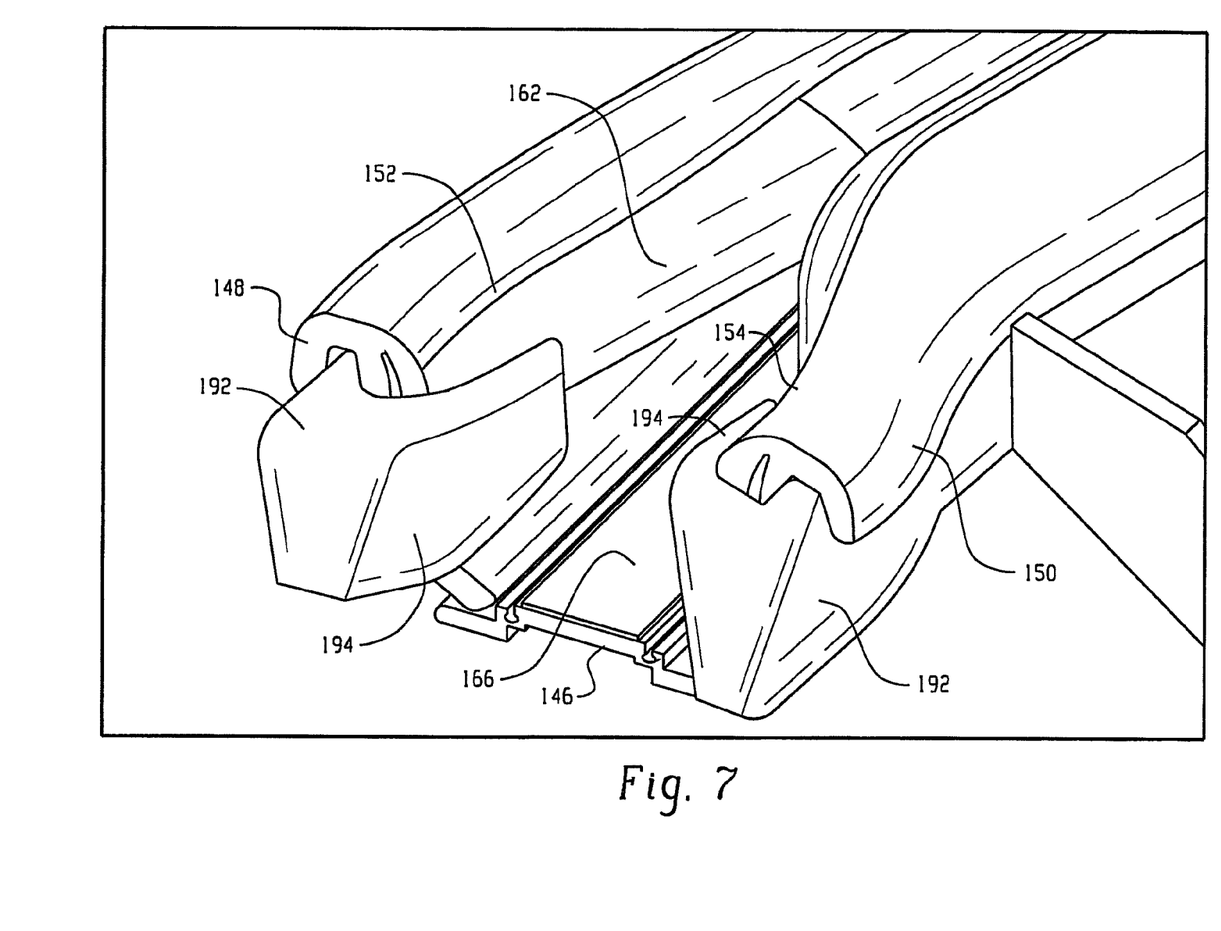
FIG. 7 is a still further enlarged view of the first end of the new below belt bracket assembly.

The glassrun 140 likewise includes first and second sidewalls 142, 144 that are interconnected by a base member 146. When the glassrun 140 is received in the cavity 126 of the bracket, the sidewalls 120/142 and 122/144 generally align with one another and the base wall 124 of the bracket supports the base member 146 of the weatherstrip. In addition, the weatherstrip 140 includes first and second cover lips 148, 150, extending outwardly away from the cavity at a location at the upper end of each sidewall. As perhaps best illustrated in FIGS. 4 and 5, the cover lips 148, 150 extend over the upper terminal ends of each bracket sidewall 120, 122. Further, first and second seal lips 152, 154 extend from a location at the upper end of each sidewall 142, 144 toward one another, i.e., toward cavity 156 that receives an edge of the window (not shown). One skilled in the art will appreciate that the seal lips 152, 154 do not actually extend through one another as illustrated in FIG. 5, but are formed to abut one another when the window is absent from the glassrun bracket assembly. The weatherstrip 140 is preferably formed from a material (polymer plastic, EPDM, elastomer, rubber, etc.) that is sufficiently flexible so that the seal lips 152, 154 will bend or deform as the seal lips engage opposite faces of the window glass, and when the window is not received in the below belt glassrun assembly, the seal lips resiliently engage one another.

Further, each seal lip 152, 150 preferably includes a low friction material or coating 162, 164 that reduces the friction when the seal lips engage the opposite window surfaces. It is also known to provide a hardened wear surface 166 on the base member 146 that faces inwardly toward the cavity 156.

Figure 2:
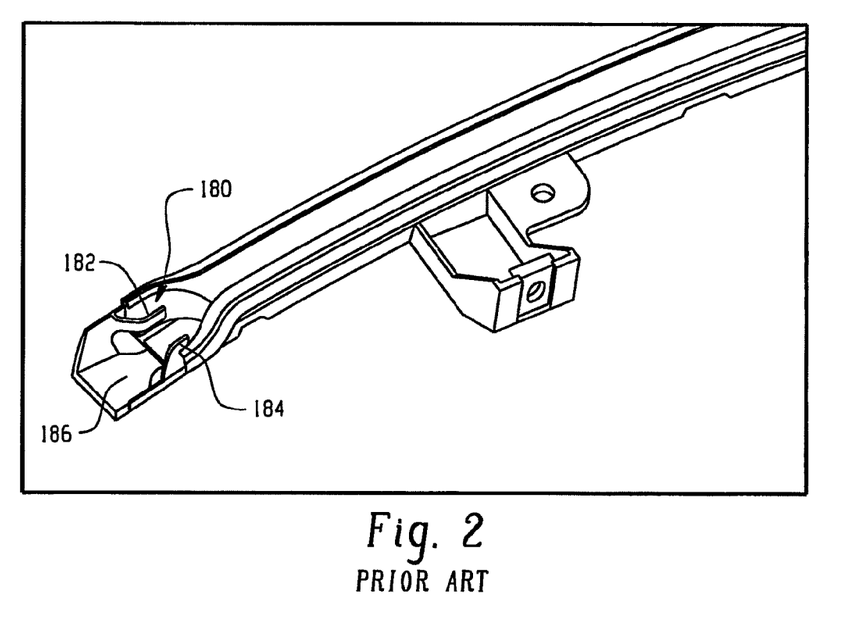
FIG. 2 is an enlarged view of a first end of a conventional below belt bracket assembly.
Figure 3:
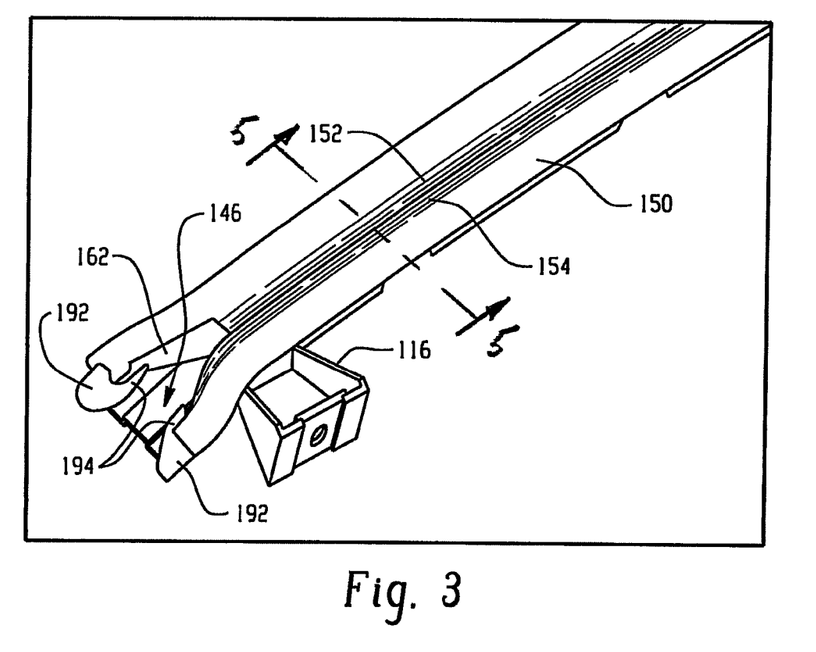
FIG. 3 is an enlarged view of a first end of the new below belt bracket assembly.

In the past, a retention assembly 180 was formed at the first end of the bracket (see FIG. 2). First and second retention members or fingers 182, 184 were spaced inwardly from a terminal end so that a widened channel portion 186 would receive the associated window, and then the window would proceed longitudinally toward the second end 114 such that the window would pass between the retention fingers 182, 184 for receipt within the glassrun. This arrangement added undesired length to the glassrun/bracket structure. In addition, the lower surface of the retention assembly was at the same height as the base wall of the bracket.

Figure 8:
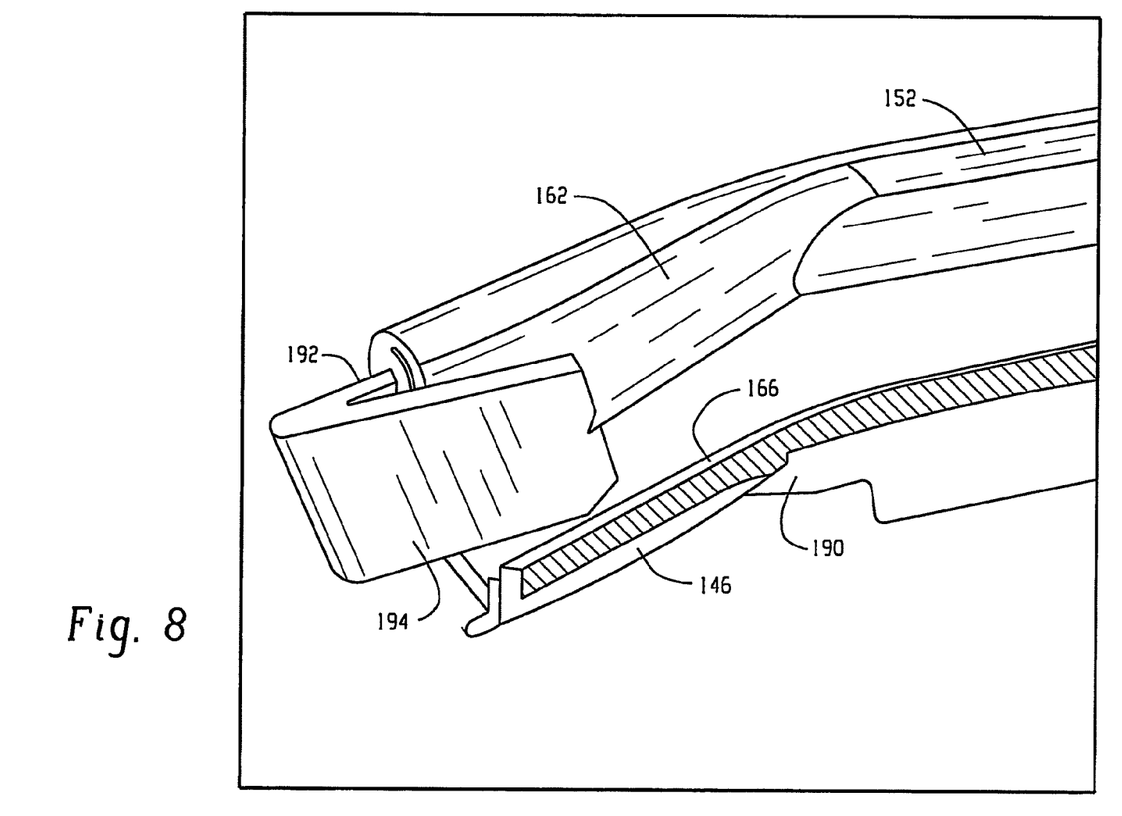
FIG. 8 is an enlarged view of the first end of the new below belt bracket assembly with one of the sidewalls of the bracket and weatherstrip removed for ease of illustration.
Figure 9:
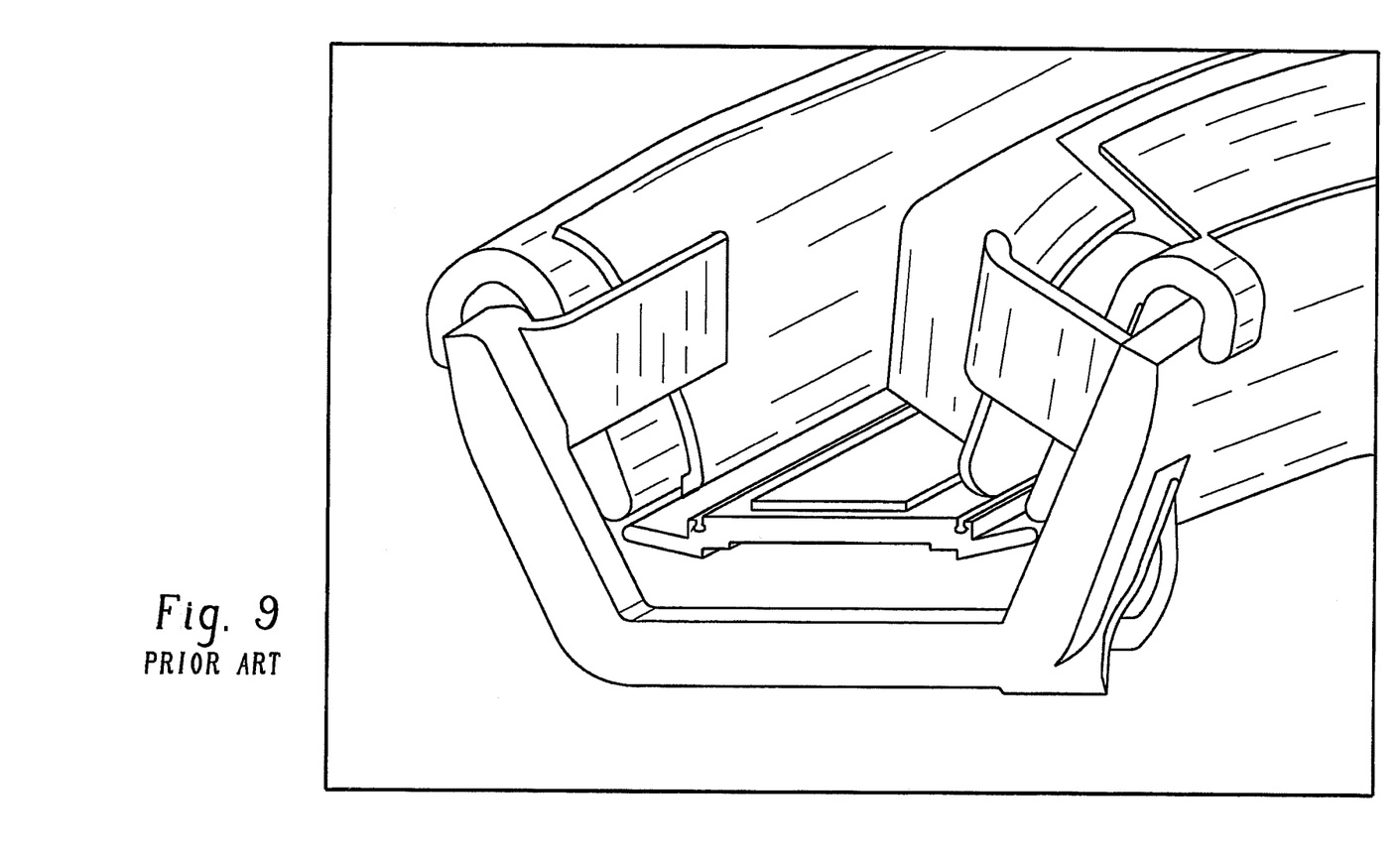
FIG. 9 is an end view of the first end of the conventional below belt bracket assembly of FIG. 2.
Figure 10:
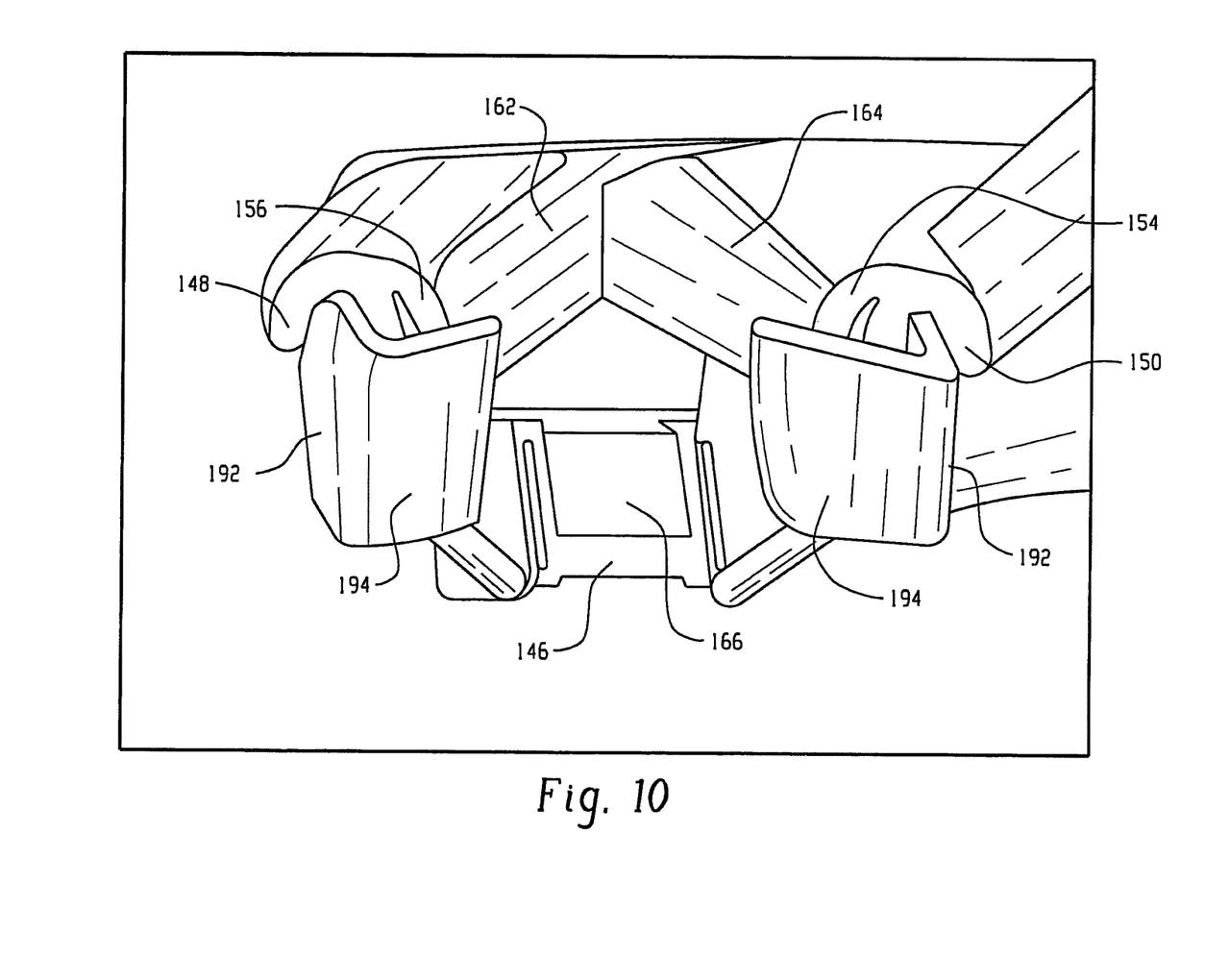
FIG. 10 is an end view of the first end of the new below belt bracket assembly.

In contrast, the present assembly modifies this arrangement by providing a recess or opening 190 in the retention assembly. More particularly, and as best seen in FIGS. 1, 4, and 8, the recess/opening 190 allows an end region of the base member 146 of the weatherstrip to pass through the recess/opening so that the base member 146 ramps below the base wall 124 of the bracket. Moreover, an upper surface of the base member 146, i.e., the surface of the hard wear surface 166, is held in place by the retention assembly, so that the base member 146 is maintained in place in the recess/opening 190.

The retention assembly includes hook-shaped fingers on each side. Specifically, a first retention finger 192 extends longitudinally outward from the first end 112 of the associated bracket sidewall 120, 122 in a direction away from the second end 114. At the terminal end, a second retention finger 194 then extends in spaced relation with the first retention finger 192 in a direction toward the second end 114 of the bracket. The first and second retention fingers 192, 194 form a gap 196 that has a dimension that closely approximates the thickness of the associated sidewall 142, 144 of the glassrun. It will also be appreciated that the first retention fingers 192 taper outwardly from the respective sidewalls 142, 144 of the bracket. This splays or opens the configuration of the sidewalls 142, 144 relative to the base member 146 of the glassrun 140 so that the second retention fingers 194 are spaced further apart to reduce glass slap. Further, the spacing between the second retention fingers and the ramped contour of the region of the base member 146 received in the recess/opening 190 more easily accommodate the movable window.

As is also evident FIGS. 6-8, and 10, the second retention fingers 194 are contoured relative to the first retention fingers 192 so that the respective seal lips 152, 154 of the glassrun are maintained in the gap 196. This facilitates transition of the window edge into the glassrun, as well as providing for a secure retention of the glassrun in the bracket.

Figure 11:
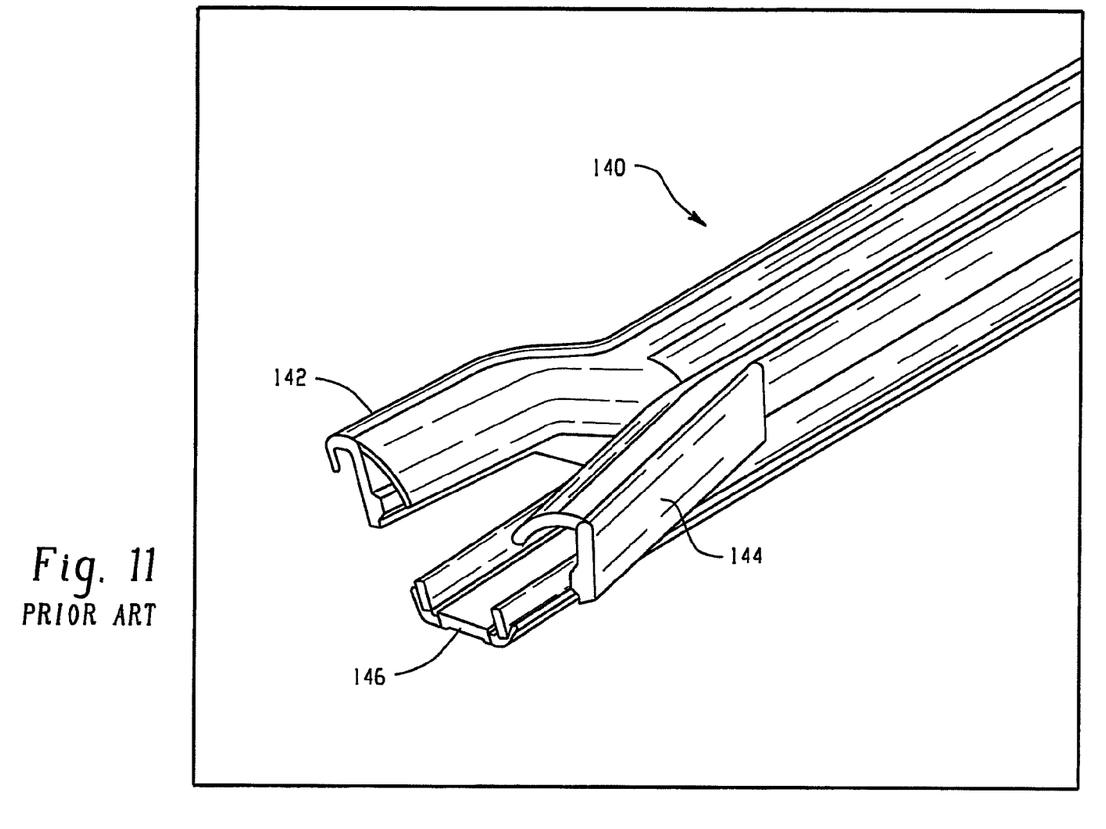
FIG. 11 illustrates the conventional notching operation of a conventional below belt bracket assembly.
Figure 12:
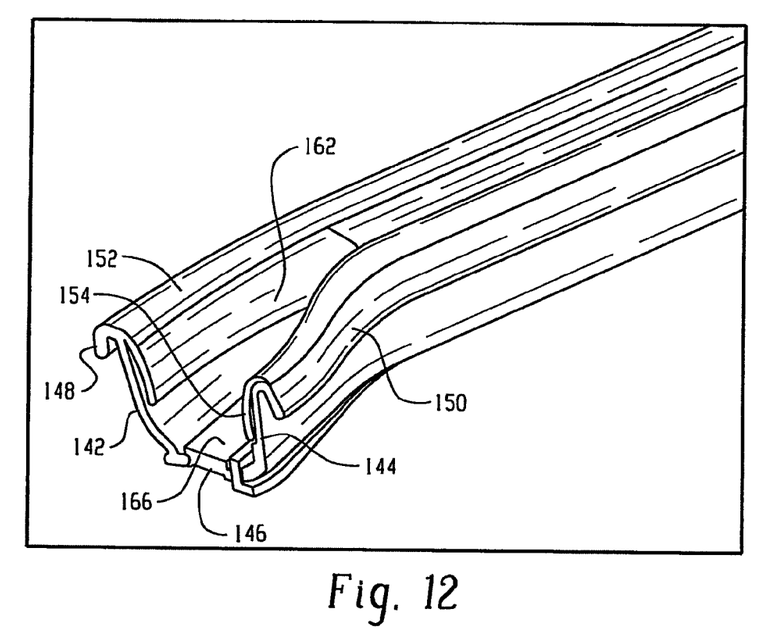
FIG. 12 illustrates the final shape of the first end of the weatherstrip of the new below belt bracket assembly.
Figure 13:
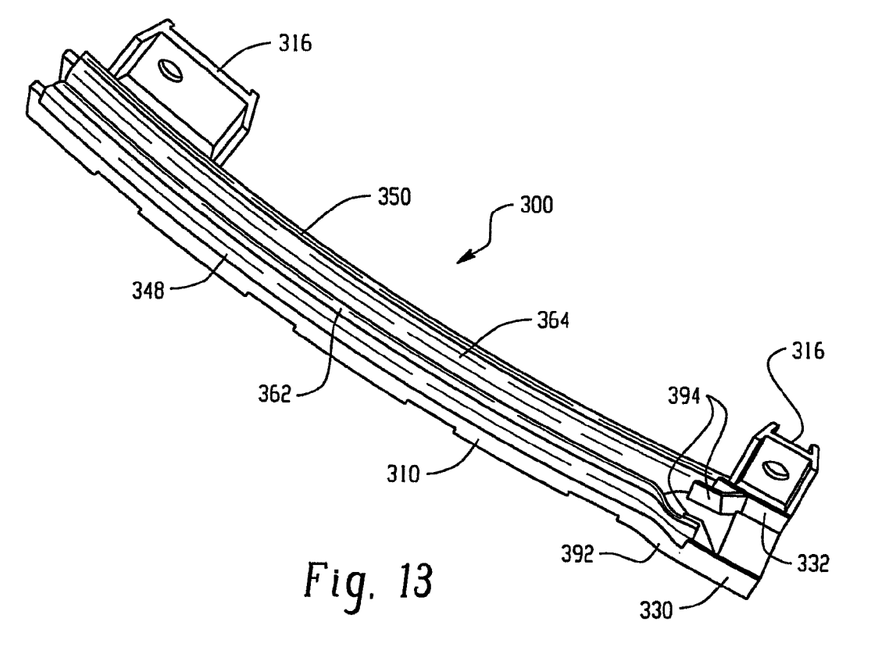
FIG. 13 is a perspective view of an alternate embodiment of a below belt bracket assembly.
Figure 14:
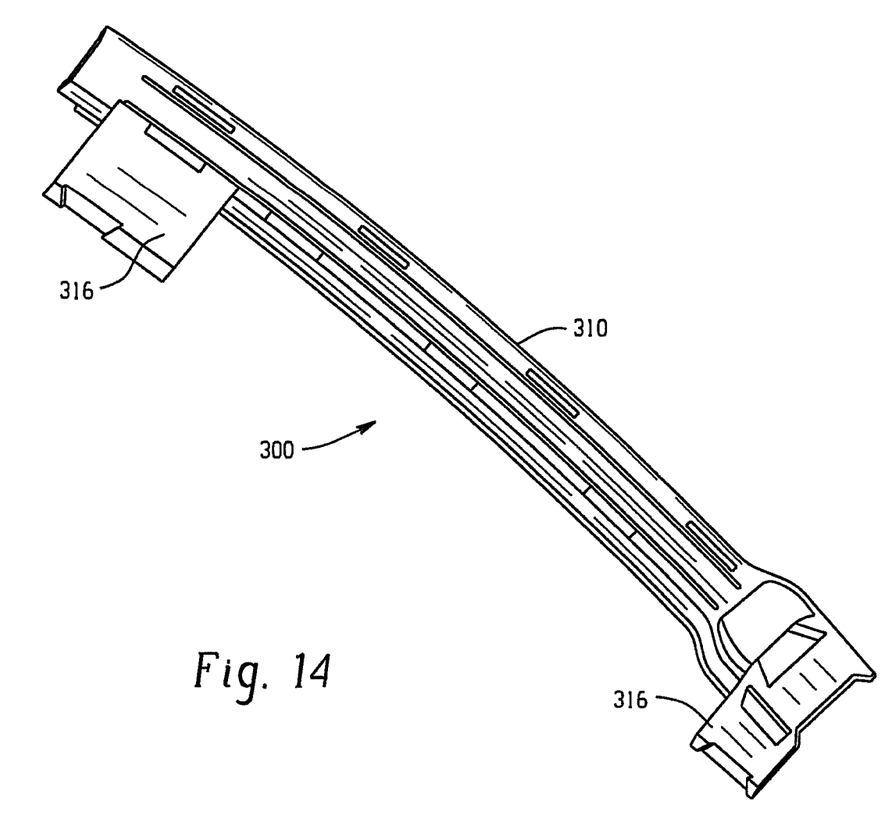
FIG. 14 is a perspective view of the opposite side.
Figure 15:
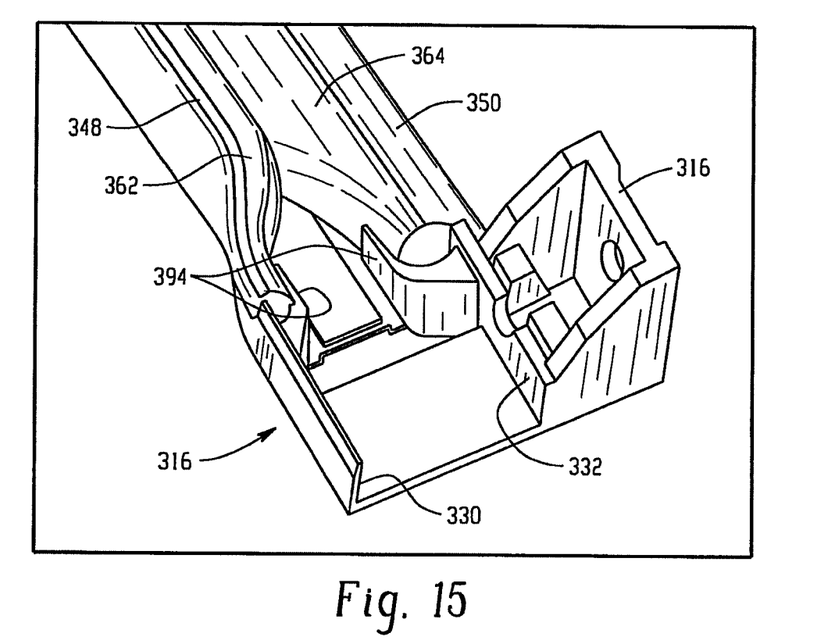
FIGS. 15 and 16 are enlarged perspective views of one end of the alternate below belt bracket assembly of FIGS. 13 and 14.
Figure 16:
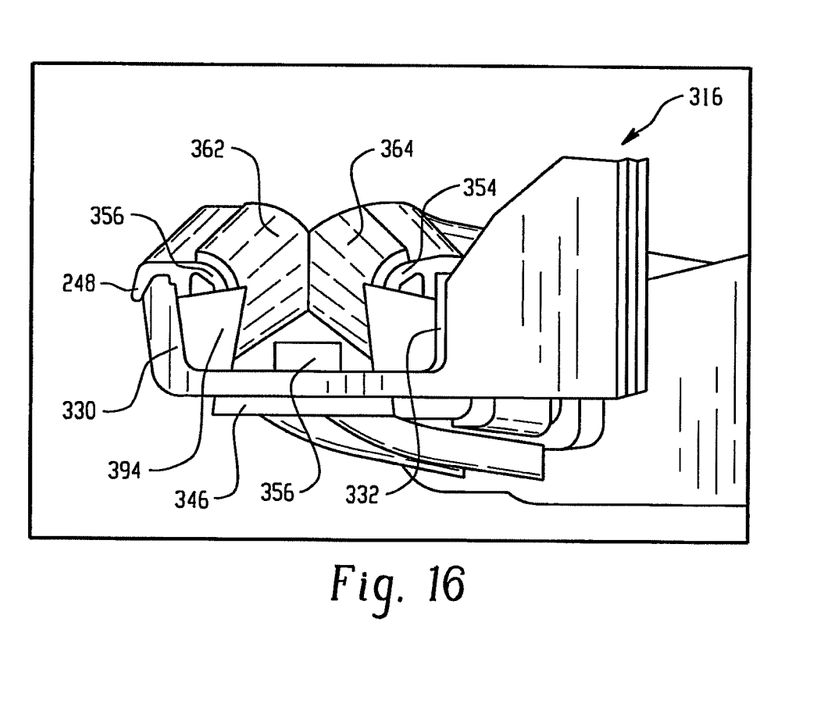

As a result of using the modified bracket, the prior art notching arrangement shown in FIG. 11 is eliminated. That is in the past, notching of end regions of the glassrun adjacent the interface between the sidewalls and the base member was used to open up the terminal end of the glassrun and allow the glassrun to engage the prior art structure for the bracket. In contrast, the contour of the glassrun (shown in FIG. 12 with the bracket removed for ease of illustration) at the end region of the base member 146 tapers downwardly from the remainder of the base member where the base member is received in the opening/recess 190, and the sidewalls 142, 144 taper outwardly in this end region.

FIGS. 4 and 5 more particularly illustrate at least one stiffening member, and preferably first and second stiffening members 220, 222, on the bracket 110. More specifically, the stiffening members 220, 222 are formed in the base wall 124 of the bracket 110 and face outwardly from a lower surface of the base wall, i.e. away from the cavity 126. The stiffening members 220, 222 assist in keeping the desired shape of the bracket 120. In addition, the cross-section of the bracket 110 is designed to control the shrink rate of different wall thicknesses, which again contributes to straightening of the bracket.

In FIGS. 13-16, an alternate embodiment of the below belt bracket is shown. More particularly, the below belt bracket assembly 300 includes a support bracket 310, again preferably formed from a polymer or plastic material. The primary distinction relative to the earlier described embodiment is that one of the fastening portions 316 is located forwardly of the end of the bracket. For purposes of brevity and consistency, like components are identified by like reference numerals in the "300" series, e.g., compare the below belt bracket assembly 100 in FIG. 1 with below belt bracket assembly 300 in FIG. 13, and new components will be identified by new numerals. Positioning of the fastening portion 316 axially outward or outboard of the entrance region of the glass run allows the fastening portion 316 to have extended walls or wall portions 330, 332 beyond the retention fingers 392, 394. Thus extended wall portions 330, 332 extend axially outward of and form continuations of the first retention fingers 392. The extended wall portions 330, 332 serve to further guide the window into the entrance region defined between the retention fingers 392, 394.

This arrangement of FIGS. 13-16 also allows the fastening portion that receives the fastener(s) (not shown) to secure the bracket 110 at a different below belt location in the vehicle door. This can be achieved without destroying the functionality of the modified entry that receives the window at one end of the glassrun.

The disclosures described with reference to the preferred embodiments. Of course modifications and alterations will become apparent to those of ordinary skill in the art and are intended be covered if such modifications and alterations fall within the scope of the appended claims.

Having described the invention, it is now claimed:

1. A below belt bracket assembly comprising:
   a weatherstrip having first and second sidewalls interconnected along a base member, and forming a cavity configured to receive an associated window edge therein; and
   a support member having a cavity configured to at least partially receive the weatherstrip therein, a first end of the support member including first and second retention members that each operatively engage an end region of the weatherstrip, and a recess or an opening between the first and second retention members dimensioned to receive the end region of the base member wherein the longitudinal end region of the weatherstrip base member ramps downwardly from a support member base wall and is received in the recess or opening.

2. The assembly of claim 1 wherein the support member includes first and second sidewalls that receive first and second sidewalls, respectively, of the weatherstrip and a base wall that interconnects the first and second sidewalls.

3. The assembly of claim 2 wherein the base wall includes the recess or opening that is dimensioned to receive the end region of the weatherstrip base member.

4. The assembly of claim 3 wherein the end region weatherstrip base member ramps downwardly from the support member base wall through the opening.

5. The assembly of claim 4 wherein the first and second sidewalls diverge from one another along the end region.

6. The assembly of claim 5 wherein the first and second retention members are configured to abut an upper surface of the weatherstrip base member and position a terminal end of the weatherstrip base member below the support member base wall.

7. The assembly of claim 6 wherein the first and second retention members extend into the support member cavity from respective terminal ends of the support member sidewalls.

8. The assembly of claim 7 wherein lower edges of the first and second retention members are configured to engage the upper surface of the weatherstrip base member along respective interfaces with the weatherstrip first and second sidewalls.

9. The assembly of claim 2 wherein the base wall includes at least one stiffening member extending along at least a portion of a longitudinal length of the support member.

10. The assembly of claim 9 wherein the at least one stiffening member includes first and second continuous ribs along an outer surface of the support member.

11. A glassrun system comprising:
    an elongated substantially rigid support member having first and second ends disposed in spaced relation along an elongated direction, the support member including first and second sidewalls disposed in spaced relation and interconnected along one edge by a base wall to define a cavity, and the base wall including a recess at the first end extending inwardly a limited dimension toward the second end of the support member; and
    an unsupported glassrun having first and second ends disposed in spaced relation along an elongated direction substantially co-terminous with the support member, the glassrun including first and second sidewalls joined by a base member and dimensioned for least partial receipt in the cavity of the support member, and the base member, first sidewall, and second sidewall of the glassrun respectively dimensioned for receipt along the base wall, first sidewall, and second sidewall of the support member, and the first and second sidewalls of the glassrun extending over distal terminal edges of the support member first and second sidewalls, respectively, and a terminal end region of the base member received in the base wall recess of the support member.

12. The glassrun system of claim 11 wherein the first and second sidewalls of the support member each include a retention member at the first end for operative engagement with the first and second sidewalls of the glassrun, respectively.

13. The glassrun system of claim 12 wherein the retention members extend outwardly at the first end of the support member in a longitudinal direction opposite that of a second end thereof.

14. The glassrun system of claim 12 wherein each retention member includes a generally u-shaped hook conformation in which a first leg of the hook extends in a longitudinal direction at the first end of the support member and a second leg extends in an opposite longitudinal direction towards the second end of the support member.

15. The glassrun system of claim 14 wherein the first and second legs of the retention members are spaced apart a first dimension that receives the first and second sidewalls of the glassrun therein.

16. The glassrun system of claim 15 wherein the base member extends beneath the second legs of the retention members whereby a terminal end of the weatherstrip base member is positioned below the support member base wall.

17. The glassrun system of claim 11 wherein the glassrun includes a cover lip and a sealing lip extending from each of the first and second sidewalls of the glassrun, the cover lips configured to extend over terminal edges of the respective support member sidewalls, respectively, and the sealing lips extending inwardly toward the base member for selective engagement with opposite faces of an associated vehicle window edge received in the glassrun.

* * * * *